(No Model.)
J. C. HAGERTY.
BARK CUTTING MACHINE.
No. 264,152. Patented Sept. 12, 1882.
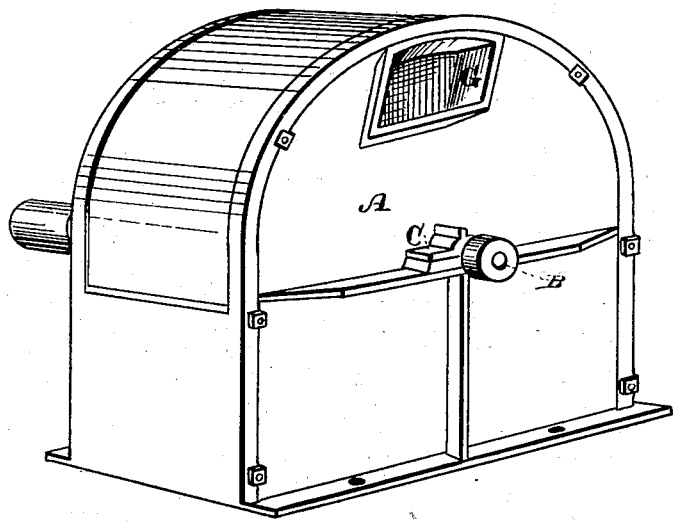
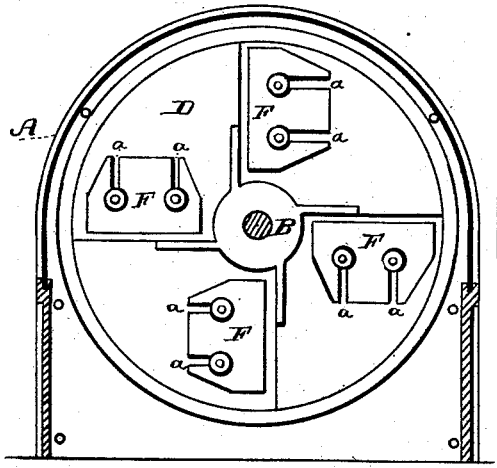
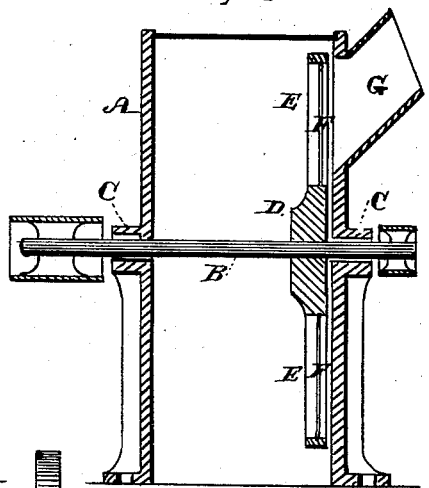
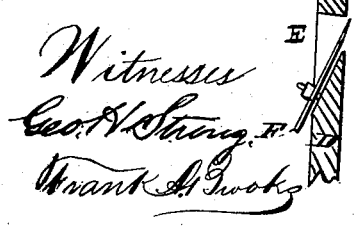
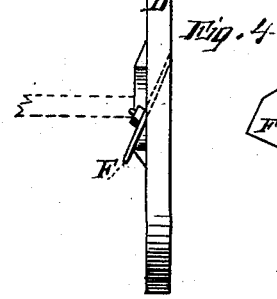
Witnesses
Geo. H. Strong
Frank A. Brooks
Inventor
John C. Hagerty
By Dewey & Co.
Attys
N. PETERS. Photo-Lithographer, Washington, D. C.

UNITED STATES PATENT OFFICE.

JOHN C. HAGERTY, OF SANTA CRUZ, CALIFORNIA.

BARK-CUTTING MACHINE.

SPECIFICATION forming part of Letters Patent No. 264,152, dated September 12, 1882.

Application filed November 18, 1881. (No model.)

*To all whom it may concern:*

Be it known that I, JOHN C. HAGERTY, of Santa Cruz, county of Santa Cruz, State of California, have invented a Bark-Cutting Machine; and I hereby declare the following to be a full, clear, and exact description thereof.

My invention relates to an apparatus for preparing bark for tanners' use; and it consists in the improvements hereinafter described and claimed.

Referring to the accompanying drawings for a more complete explanation of my invention, Figure 1 is a perspective view of the machine. Fig. 2 is a longitudinal vertical section thereof. Fig. 3 is a transverse vertical section. Figs. 4, 5, 6 are detail views.

A is a case which is formed with metallic sides sufficiently strong to support the boxes for the shaft-journals, and having a light sheet-metal cover; or it may be made of any other suitable material. The shaft B extends across within this case, being supported in journal-boxes C, and provided with a pulley, by which it is driven. Upon this shaft is a disk, D, which is set close to one side of the case, as shown.

Radial slots E are made through the disk, any suitable or desired number being employed. Cutting blades or knives F are secured so as to stand at an angle through these slots, the edge being in the direction toward which the disk turns, so as to cut like a plane. The slots are wide enough to permit the escape of the material through them as it is cut. In order to make the knives easily removable and adjustable in their places, each one has two slots, *a*, extending from the back toward the edge, and these slots terminate in enlarged openings *b*, which are made of such a size that the heads of the holding-bolts will pass through them. When the knives are to be removed the bolts are loosened, and the knives drawn back until the bolt-heads will pass through the holes, thus allowing the knives to be taken out from the back of the disk without being pushed through to the front at all. When they are to be placed in the machine the holes slip over the bolt-heads, and the knives are then set forward to the proper mark, after which the bolts are screwed down until the heads bind upon the sides of the narrower slots *a*. This allows a quick and easy adjustment of the knives without removing the bolts.

The side of the case near which the disk D revolves has an opening made in it, and a guiding-chute, G, is fixed upon the side of the case so as to stand at an angle with it, as shown. Through this the bark is fed so that it may be pressed against the face of the disk at an angle, and the disk being set in rapid rotation, its knives will cut the bark into small fragments, which escape through slots in which the knives stand into the rear part of the case, whence they fall through suitable discharge-openings. The bark is introduced endwise and pushed in until it comes in contact with the rapidly-moving knives, when it is shaved off at an angle but across the grain in thin sheets, which are reduced to small particles in their passage through the disk. The angle at which the strips of bark are introduced facilitates a more rapid cutting than if they were introduced squarely or at right angles with the cutters, and it also assists to feed the bark in as it is cut. The knives may be set to cut coarser or finer, as may be desired. This particular cut given the bark leaves it in a shape in which the valuable portion may be more easily extracted then when reduced in any other manner.

Having thus described my invention, what I claim as new, and desire to secure by Letters Patent, is—

A bark cutting and reducing machine consisting of case A, shaft B, feed-chute G, and disk D, having radial slots E, screw-bolts, and cutting knives or blades F, fitted into said slots, said knives being provided with slots *a a* and enlarged openings *b b*, all substantially as herein described, and for the purpose set forth.

In witness whereof I have hereunto set my hand.

JOHN C. HAGERTY.

Witnesses:
FRANK A. BROOKS,
S. H. NOURSE.